US012326530B2

(12) United States Patent
Ni et al.

(10) Patent No.: US 12,326,530 B2
(45) Date of Patent: Jun. 10, 2025

(54) LOW-FREQUENCY SEISMIC SURVEY DESIGN

(71) Applicant: BP Corporation North America Inc., Houston, TX (US)

(72) Inventors: Dianne Ni, Katy, TX (US); Imtiaz Ahmed, Katy, TX (US); Andrew Brenders, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 303 days.

(21) Appl. No.: 17/441,372

(22) PCT Filed: Mar. 10, 2020

(86) PCT No.: PCT/US2020/021787
§ 371 (c)(1),
(2) Date: Sep. 21, 2021

(87) PCT Pub. No.: WO2020/205169
PCT Pub. Date: Oct. 8, 2020

(65) Prior Publication Data
US 2022/0236435 A1 Jul. 28, 2022

Related U.S. Application Data

(60) Provisional application No. 62/826,251, filed on Mar. 29, 2019.

(51) Int. Cl.
*G01V 1/30* (2006.01)
*G01V 1/28* (2006.01)
(52) U.S. Cl.
CPC .............. *G01V 1/303* (2013.01); *G01V 1/282* (2013.01); *G01V 2200/14* (2013.01); *G01V 2210/679* (2013.01)

(58) Field of Classification Search
CPC ..... G01V 1/303; G01V 1/282; G01V 2200/14; G01V 2210/679; G01V 1/3808; G01V 1/003
See application file for complete search history.

(56) References Cited

U.S. PATENT DOCUMENTS

| | | | |
|---|---|---|---|
| 2011/0103187 A1* | 5/2011 | Albertin | G01V 1/28 367/73 |
| 2011/0176386 A1* | 7/2011 | Lapilli | G01V 1/282 367/73 |

(Continued)

OTHER PUBLICATIONS

Yang et al. (Yang et al. "Reverse time migration with combined source-receiver illumination.", Paper presented at the 2018 SEG International Exposition and Annual Meeting, Anaheim, California, USA, Oct. 2018) (Year: 2018).*

(Continued)

*Primary Examiner* — Yuqing Xiao
*Assistant Examiner* — Christopher Richard Walker
(74) *Attorney, Agent, or Firm* — CONLEY ROSE, P.C.

(57) ABSTRACT

A method, and system to implement the process, of selecting a plurality of sets of source and receiver locations over a survey area, modeling on a subsurface attribute model of a subterranean region each source and receiver pair of the plurality of sets of source and receiver locations to generate low frequency seismic data, performing a reverse time migration on the low frequency seismic data to reposition diving wave energy of each source and receiver pair of the plurality of sets of source and receiver locations to generate a diving wave illumination image, extracting seismic amplitudes from the diving wave illumination image at a region of interest, and computing a contribution of a respective diving wave from each source and receiver pair of the plurality of sets of source and receiver locations to diving waves passing through the region of interest.

15 Claims, 4 Drawing Sheets

(56) References Cited

U.S. PATENT DOCUMENTS

| | | | |
|---|---|---|---|
| 2013/0077440 A1* | 3/2013 | Cao | G01V 1/345 |
| | | | 367/73 |
| 2014/0165694 A1* | 6/2014 | Bousquie | G01V 1/3808 |
| | | | 73/1.85 |
| 2014/0293744 A1 | 10/2014 | Zhang | |
| 2015/0120200 A1* | 4/2015 | Brenders | G01V 1/005 |
| | | | 702/18 |
| 2017/0176613 A1* | 6/2017 | Burnett | G01V 11/00 |
| 2018/0156931 A1 | 6/2018 | Ahmed | |
| 2018/0180756 A1* | 6/2018 | Luo | G01V 1/50 |

OTHER PUBLICATIONS

PCT/US2020/021787 International Search Report and Written Opinion dated Jun. 26, 2020 (12 p.).
Sirgue, Lauarent et al., "Efficient Waveform Inversion and Imaging: A Strategy for Selecting Temporal Frequencies," Geophysics, vol. 69, No. 1, Jan. 2004, pp. 231-248 (18 p.).

* cited by examiner

LOW-FREQUENCY SEISMIC SURVEY DESIGN

CROSS-REFERENCE TO RELATED APPLICATIONS

This application is a 35 U.S.C. § 371 U.S. National Stage Entry application of PCT/US2020/021787 filed Mar. 10, 2020, and entitled "Low-Frequency Seismic Survey Design," which claims priority to U.S. Provisional patent application No. 62/826,251, filed with the United States Patent and Trademark Office on Mar. 29, 2019 and entitled "Low-Frequency Seismic Survey Design," the disclosure of each of which is incorporated herein by reference in its entirety for all purposes.

BACKGROUND

The present disclosure relates generally to seismic acquisition modeling, and more specifically, to seismic modeling techniques to be used for seismic survey design with or without simultaneous source acquisition.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., acoustic wave) signal that travels downward through the Earth, is reflected, and, upon its return, is recorded using one or more receivers disposed on or above the subsurface region of the Earth. The seismic data recorded by the receivers may be used to create an image or profile of the corresponding subsurface region.

Seismic survey designs provide locations for the energy sources and receivers (otherwise known as acquisition geometry). The survey designs are generated with a goal of ensuring that seismic acquisition will have adequate illumination of targets of interest to allow for imaging or mapping of the subsurface region. As such, it may be useful to develop survey designs that result in improvements of the imaging or mapping of the subsurface region, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images or velocity models. Seismic images may be used, for example, in the determination of hydrocarbon deposits (e.g., areas within a subsurface that contain hydrocarbons) and/or subsurface drilling hazards. Seismic images are generally produced using seismic waveforms produced by a source, reflected off regions within a subsurface, and received by one or more receivers. The seismic images that are generated depend greatly on the locations of the sources and receivers, also known as the acquisition geometry, of a seismic survey design. Trial and error may be used to determine the acquisition geometry of a seismic survey design. However, seismic surveying is too costly to be performed using trial and error to find a suitable acquisition geometry. So computational modeling and analysis can be used to evaluate prospective acquisition geometries to determine which might yield the most desirable survey results.

Additionally, there are a number of physical attributes of the subsurface formation that are of interest to geophysicists. One such physical attribute is the velocity and it is often examined using a "velocity model." A velocity model is a representation of the subsurface geological formation that can be used in analysis of seismic data. To convert the seismic data into the "seismic image," geophysicists use an analysis of the subsurface velocities. This calculation of the velocity model is also computationally expensive, and its accuracy and resolution directly affect the quality of the seismic image.

One technique involves the modeling of seismic acquisition when designing a survey (e.g., a wide azimuth towed streamer or ocean bottom node survey) with the goal of ensuring the proposed survey geometry will have adequate illumination of the targets of interest for imaging purposes. Illumination of targets generally refers to reflecting seismic energy off of the targets. However, in areas with a complex overburden, the difficulty in obtaining an adequate image can result from shortcomings with the velocity model used for imaging, not from shortcomings with the illumination. Thus, even if the target region is adequately illuminated, the image can be poor if the velocity model above does not allow for a good image. Accordingly, techniques and systems described herein perform acquisition modeling in order to design seismic surveys that improve the building of velocity models. The goal is to determine where to put the receivers and sources to best achieve the objective of building an adequate velocity model.

Embodiments of the seismic acquisition modeling techniques for designing a seismic survey include the following steps. One step includes selection of several sets of source and receiver locations over the survey area. Another step includes modeling the low-frequency seismic response with a representative velocity model for all those sources and receivers. Another step includes migrating the modelled synthetic seismic response using Reverse Time Migration (RTM) to reposition refraction wave and/or diving wave energy to the subsurface model. As described in further detail below, the diving wave energy corresponds to the seismic energy that is refracted from the subsurface, and which originates from the sources. Another step includes extracting seismic amplitudes along target reservoir horizons/surfaces or velocity problematic regions, and another step includes computing contributions of individual receiver and source locations to the target region(s) and coming up with the final product of maps to display which sources/receivers contribute to the diving waves passing through those zones.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Seismic image generation depends greatly on the locations of the sources and receivers, also known as the acquisition geometry, of a seismic survey design as well as well as models of subsurface attribute models, such as a velocity model. The building of a velocity model can be enhanced through the selection of acquisition geometry of a seismic survey design. Accordingly, the techniques and systems described below allow for determinations of acquisition geometry of a seismic survey design that allows for velocity model building, which may be useful, for example, in situations in which a limiting factor on seismic imaging is the accuracy of the velocity model.

Figure 1:
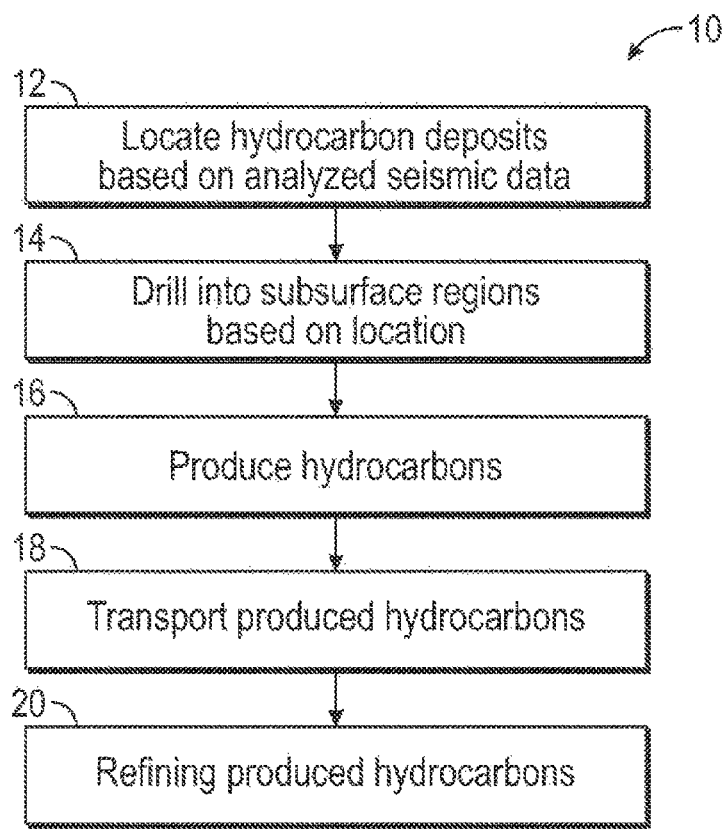
FIG. 1 illustrates a flow chart of various processes that may be performed based on the analysis of seismic data acquired via a seismic survey system, in accordance with embodiments presented herein.
Figure 2:
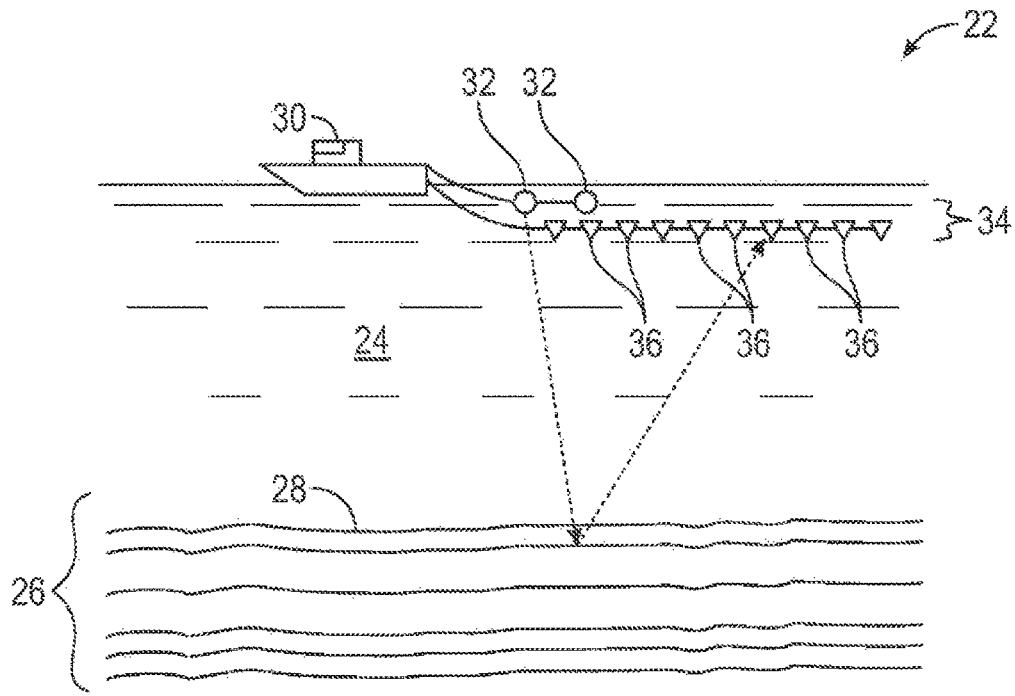
FIG. 2 illustrates a marine survey system in a marine environment, in accordance with embodiments presented herein.
Figure 3:
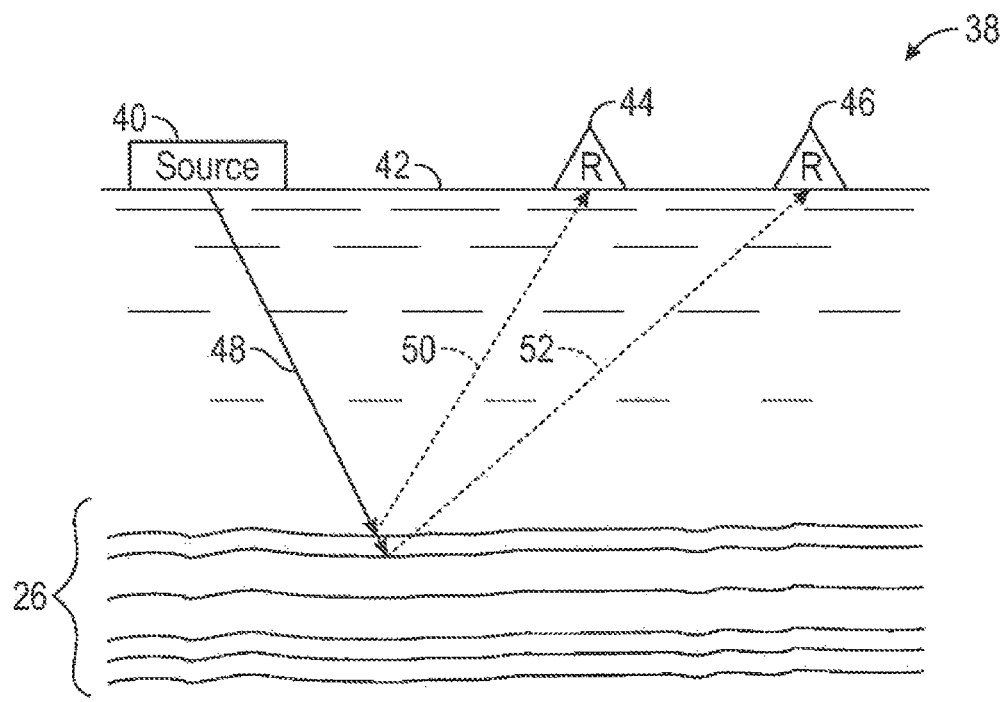
FIG. 3 illustrates a land survey system in a land environment, in accordance with embodiments presented herein.

By way of introduction, seismic data may be acquired using a variety of seismic survey systems and techniques, two of which are discussed with respect to FIG. 2 and FIG. 3. Regardless of the gathering technique utilized, after the seismic data is acquired, a computing system may analyze the acquired seismic data and use results of the seismic data analysis (e.g., seismogram, map of geological formation) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like, After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like, via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32 (which may be also be referred to as a source 32), a streamer 34 (which may be also be referred to as a seismic streamer 34), a receiver 36 (which may also be referred to as a seismic receiver 36) and/or other equipment that may assist in acquiring seismic images representative of geological formations within a subsurface region 26 of the Earth. The vessel 30 may tow the seismic source 32 (e.g., an airgun array) that may produce energy, such as acoustic waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an airgun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, streamers 34, and the like to perform the operations of the marine survey system 22.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 (which may be also be referred to as a source 40) and a (land-based) seismic receiver 44 (which may be also be referred to as a receiver 44). In some embodiments, the land survey system 38 may include one or more multiple seismic sources 40 and one or more seismic receivers 44 and 46 (which may also be referred to as a receiver 44 and/or a receiver 46). Indeed, for discussion purposes, FIG. 3 includes a seismic source 40 and two seismic receivers 44 and 46. The seismic source 40 (e.g., seismic vibrator) may be disposed on a surface 42 of the Earth above the subsurface region 26 of interest. The seismic source 40 may produce energy (e.g., acoustic waves, seismic waveforms) directed at the subsurface region 26 of the Earth. Upon reaching various geological formations (e.g., salt domes, faults, folds) within the subsurface region 26, the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the first seismic receiver 44 may receive a reflected seismic waveform 50 and the second receiver 46 may receive a reflected seismic waveform 52.

Figure 4:
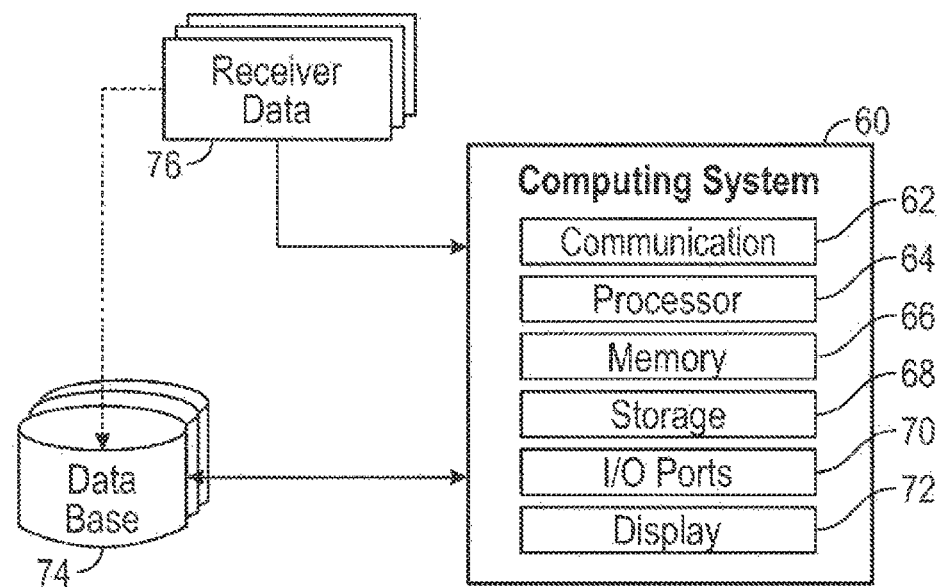
FIG. 4 illustrates a computing system that may perform operations described herein based on data acquired via the marine survey system of FIG. 2 and/or the land survey system of FIG. 3, in accordance with embodiments presented herein.

Regardless of how the seismic data are acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine-readable media), storage 68 (e.g., a tangible, non-transitory, machine-readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22, the land survey system 38, or the like.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLED) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and/or control certain operations of the seismic sources 32 or 40, the receivers 36, 44, 46, or the like. Further, it may be noted that the listed components are provided as example components, and the embodiments described herein are not to be limited to the components described with reference to FIG. 4.

Figure 5:
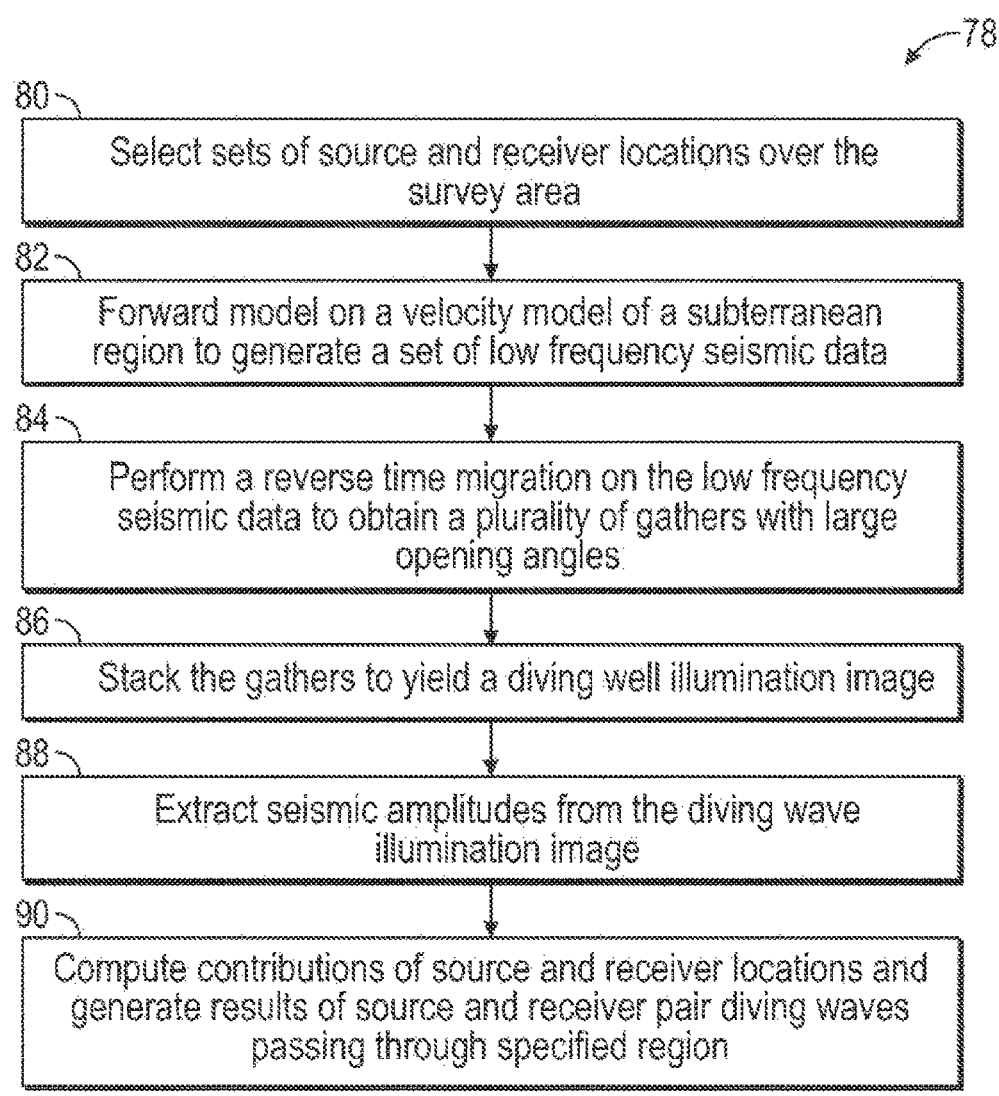
FIG. 5 illustrates a processing sequence utilized in conjunction with the computing system of FIG. 4, in accordance with embodiments presented herein.

In some embodiments, the computing system 60 (e.g., the processor 64 operating in conjunction with at least one of the memory 66 or the storage 68) may invoke an application or other computer program to perform the process 78 that is illustrated in FIG. 5. As will be discussed, the process 78 (e.g., a method performed on or by computing system 60) generates an acquisition geometry by determining contributions of sets of source and receiver locations to diving waves passing through a particular zone or area of the subsurface region of interest (i.e., a zone or area of the subsurface region being imaged, which also may be referred to as a depth of investigation). For example, one or more embodiments can determine which source/receiver locations produce diving waves which pass through the particular zone of interest. The method can then configure the generated acquisition geometry to use some or all of these locations which produce the diving waves which pass through the zone of interest. The depth of investigation (DOI) may be considered to be the depth at which useable information is obtained from a given survey for a given longitudinal and latitudinal coordinate within the subsurface region and it is a function of several well-known parameters such as source and receiver placement, the attributes of the seismic signal, the subsurface velocities, etc.

A velocity model may have already been generated at the time the process 78 of FIG. 5 is instituted. The velocity model is a model of a particular subterranean region of the earth that has already been surveyed or that is going to be surveyed. The velocity model can be generated using conventional techniques.

The velocity model is generated from data (not shown) representative of the subterranean region of the earth. In the illustrated embodiments, the data can include seismic data acquired in a previous seismic survey. Alternative embodiments may use other sources of data for this purpose in lieu of or in addition to seismic data if desired. Such other data sources may include, by way of example, well logs, gravity surveys, electromagnetic surveys, geological inspections, etc. Those in the art having the benefit of this disclosure may recognize still further sources of data that may be suitable for this purpose.

With seismic data of sufficiently low frequencies and sufficiently high signal-to-noise, one technique for constructing a velocity model from seismic data is full-waveform inversion ("FWI"). In an embodiment, FWI begins at low frequencies and then adds higher and higher frequencies. Within the context of the present disclosure, the term "low frequency" generally means frequencies below 10 Hz, such as between 1 Hz-10 Hz, or approximately between 2 Hz-6 Hz. However, use of lower frequencies is contemplated, for example, when seismic sources 32 or 40 operate using frequencies lower than 2 Hz.

Indeed, there may be circumstances where the "low frequency" of the modeled seismic data falls outside the range of 1 Hz-10 Hz. For example, the seismic data may be known to be particularly free of noise so that frequencies lower than 1 Hz may be used. Similarly, technology may advance to the point where seismic frequencies less than 1 Hz are readily achievable in the field. Or, one might be testing for a particularly shallow DOI, in which case frequencies higher than 10 Hz might be used. Either way, in the context of "low frequencies", the term "approximately" means that the numerical quantification is within the margin of error acceptable within the industry. For example, it is well known that during the course of a survey instrument settings and measurements may vary for a variety of reasons. Thus, a frequency of "approximately 2 Hz" includes frequencies that are not precisely 2.0 Hz but includes frequencies that vary slightly within acceptable margins of error. Similarly, a frequency range of approximately 1 Hz-10 Hz may include frequencies outside the range of 1.0 Hz-10.0 Hz provided they are within acceptable margins of error. What constitutes an"acceptable margin of error" will depend on circumstance readily apparent to those skilled in the art having the benefit of this disclosure.

The subsurface attribute model, of which a velocity model is one, slowly comes into focus with progressively finer features being added as rounds of inversion continue. The velocity model output by each stage of the process then becomes the starting model for the next stage. See L. Sirgue & R. G. Pratt, "Efficient Waveform Inversion and Imaging: A Strategy for Selecting Temporal Frequencies", 69 Geophysics 231 (2004).

In some embodiments, the velocity model of the illustrated embodiments is furthermore a "smooth" velocity model. In this context, the term "smooth" indicates that the velocity model has been low-pass filtered such that the velocity scale length is greater than the seismic wavelength of the study. However, such smoothing is not necessary to the practice all embodiments. Some alternative embodiments may use a velocity model that has not been smoothed.

With respect to the process 78 of FIG. 5, in step 80, selection of sets of source and receiver locations (i.e., selection of source 32 and receiver 36 locations and/or selection of source 40 and receiver 44 or 46 locations) over the survey area is undertaken. The process 78 is independent of the type of modeled sources and the signals they impart.

The emulated sources may be impulse sources, swept sources, or any other kind of source known to the art. As those in the art having the benefit of this disclosure will appreciate, each of these kinds of modeled sources will produce a different kind of signal. The process 78 may be used with each of them.

The process 78 continues by performing forward modeling, as step 82, on the velocity model of the subterranean region to generate a set of low frequency seismic data. This forward modeling is, more particularly, what is known as "two-way" forward modeling. In other embodiments, the forward modeling may be "one-way" forward modeling, which is generally regarded as less accurate than two-way modeling. The forward modeling at step 82 is performed with the selected sets of sources 32 or 40 and receivers 36, 44, or 46 (which were selected in step 80). Additionally, the emulated seismic signals used in the forward modeling at step 82 will be tailored to produce low frequency seismic data. Those in the art will appreciate that a seismic survey, or the forward modeling of a seismic survey, will typically include a range of frequencies in the resultant seismic data. For example, one embodiment uses a range of frequencies spanning three octaves, up to frequencies of interest capable of resolving subsurface structures at tens of meters in resolution. Forward modeling is computationally expensive, and restricting the forward modelling to low frequency seismic data can speed up the forward modelling process. The presently claimed process operates on low frequency seismic data, and so the seismic signals used in the forward modeling in step 82 may accordingly be tailored, reducing the overall computational cost of the forward modelling in step 82.

The process 78 continues in step 84 by performing a reverse time migration on the low frequency seismic data that is yielded by the forward modeling at step 82. The object of this reverse time migration is to obtain, at step 84, a plurality of image gathers with large opening angles. It is anticipated that embodiments of the claimed process will use reverse time migration techniques that discriminate between gathers with large opening angles and those that do not. One such technique is disclosed in U.S. Patent Publication 2014/0293744, entitled, "Specular Filter (SF) and Dip Oriented Partial Imaging (DOPI) Seismic Migration", filed Mar. 31, 2014, in the name of the inventor Qie Zhang and commonly assigned herewith.

Figure 6:
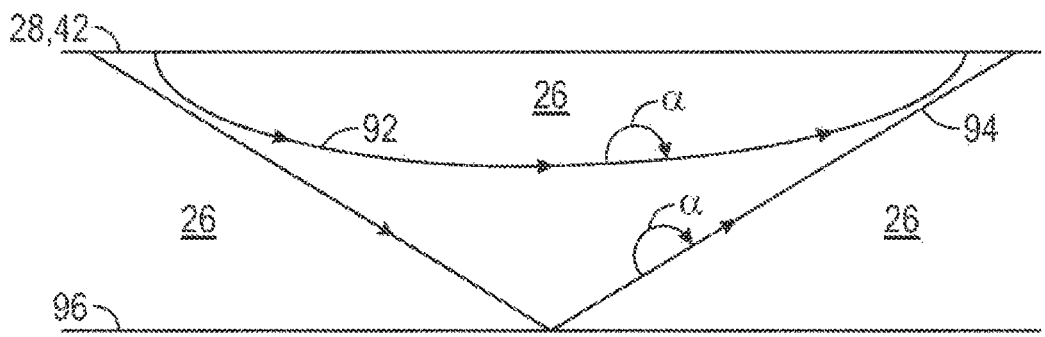
FIG. 6 illustrates an example of the path of waves initiated from the sources of the marine survey system of FIG. 2 and/or the land survey system of FIG. 3, in accordance with embodiments presented herein.

Within the context of this disclosure, "large opening angles" means those angles that equal or exceed approximately 160°. This will typically include, as shown in FIG. 6, what are known to the art as "diving waves" 92 and backscattered energy 94. Diving waves 92 are those waves that are refracted rather than reflected to/by the earth's recording surface (e.g., seafloor 28 or surface 42 of the Earth). Changes in the seismic velocity characteristic of the subterranean formation (e.g., the subsurface region 26) gradually change the direction of propagation for the energy to redirect it from a downward trajectory to an upward one. The opening angle is equal to 180° along the path of the diving waves 92. The backscattered energy 94 results from reflection at a reflector 96 in the subterranean formation (e.g., the subsurface region 26). The opening angle along the backscattered wave path 94 has an opening angle of 180°.

In this context, "approximately" means that the precise measurement for what constitutes a "large opening angle" may vary to some degree depending upon the accuracy of the reverse time migration algorithm. In this circumstance, one might relax the standard of ≥160° to include that substantial amount of energy that is close to this angle even if not exactly what is desired. Thus, some embodiments may relax the standard in order to capture that energy. Those in the art having the benefit of the disclosure herein will be able to readily exercise such personal judgment in implementing the claimed process.

As noted above, it is contemplated that most embodiments will utilize reverse time migration ("RTM") techniques, where these techniques will discriminate for and yield gathers with large opening angles. Reverse time migration is an example of wavefield-based migration, where wavefields are generated and used to form a seismic image by forward modeling a wavefield (or source wavefield). RTM can include back-propagating a set of recorded seismic data using a same forward modeling engine (the receiver wavefield). RTM can also include applying an imaging condition, such as a zero lag cross-correlation, between the source and receiver wavefields. Wavefield-based migration methods are generally considered desirable in a subterranean region that is geologically complex and that contains steeply dipping geological structures. Though computationally more expensive than ray-based migration, RTM produces a more accurate seismic image.

Returning to FIG. 5, the process 78 continues, at step 86, by stacking the image gathers with large opening angles to yield a diving wave illumination image. This step 86 may operate to reposition the diving wave energy of the diving waves 92 to the subsurface model. In this manner, steps 86 and 88, taken in conjunction, may be considered to perform a reverse time migration on low frequency seismic data to reposition energy of diving waves 92 (i.e., diving wave energy) of each source 32 and receiver 36 pair of the plurality of sets of source 32 and receiver 36 locations. Such repositioning of energy of diving waves 92 can migrate the low frequency seismic data of step 84 to reposition energy of diving waves 92 of each source 32 and receiver 36 pair of the plurality of sets of source 32 and receiver 36 locations. Such repositioning can be performed to generate a diving wave illumination image, Note that the diving wave illumination image described above contains not only the diving waves 92, but also the backscattered energy 94 whose opening angles are ≥160° as discussed above. Stacking comprises a summation of the gathers to generate the diving wave illumination image.

In this context, "approximately" means that the precise measurement for what constitutes a "large opening angle" may vary to some degree depending upon the accuracy of the reverse time migration algorithm. In this circumstance, one might relax the standard of ≥160° to include that substantial amount of energy that is close to this angle even if not exactly what is desired. Thus, some embodiments may relax the standard in order to capture that energy. Those in the art having the benefit of the disclosure herein will be able to readily exercise such personal judgment in implementing the claimed process.

The process 78 continues in step 88 by extracting seismic amplitudes along DOIs of the subsurface region 26 (i.e., target reservoir horizons/surfaces). These DOIs may be velocity problematic regions of the subsurface region 26, where source and receiver locations (i.e., selection of source 32 and receiver 36 locations and/or selection of source 40 and receiver 44 or 46 locations) may be selected to improve building of the velocity model. An example of this extraction is illustrated in conjunction with FIG. 7.

Figure 7:
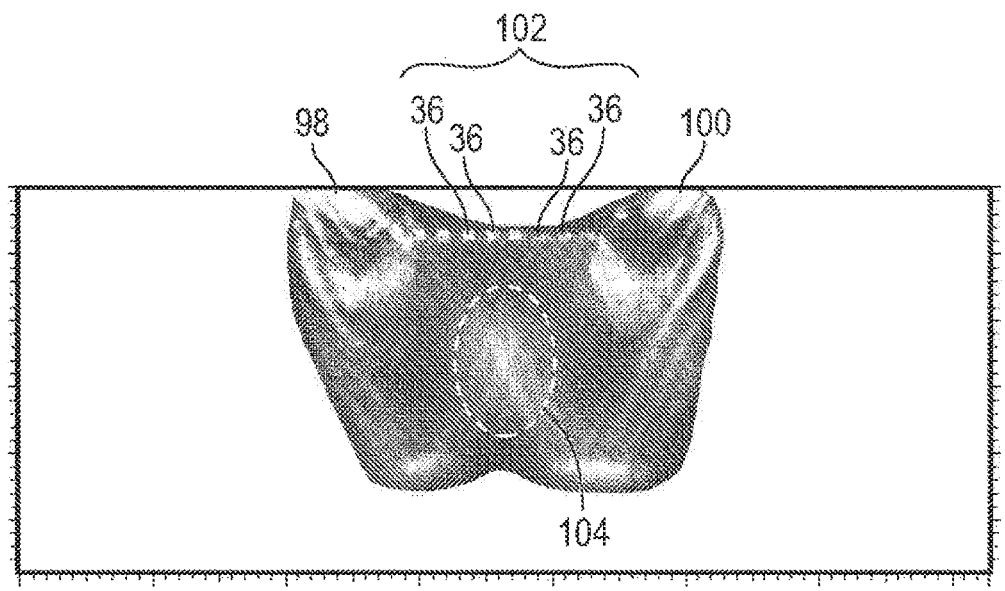
FIG. 7 illustrates migration of diving waves between sources and receivers of the marine survey system of FIG. 2, in accordance with embodiments presented herein.

FIG. 7 illustrates the modeled and migrated data from steps 84 and 86. Regions 98 and 100 inclusive of locations of sources 32 as well as a region 102 inclusive of locations of receivers 36 are illustrated in FIG. 7. In the example of FIG. 7, region 104 can correspond to a problematic region in which use of the velocity model results in poor image quality. For region 104, seismic amplitudes between pairs of sources 32 and receivers 36 may be extracted. The region 104 may, for example, be a DOI of the subsurface region 26 (i.e., a target reservoir horizon/surface). Returning to FIG. 5, for every source 32 and receiver 36 pair, there will be an individual volume extracted as a portion of step 88.

Continuing with process 78 of FIG. 5, in step 90, the contributions of individual source 32 and receiver 36 pairs to the target region(s) (e.g., one or more DOIs of the subsurface region 26) are calculated. This calculation includes determining whether diving waves 92 between the pairs of sources 32 and receivers 36 are transmitted to the target region(s). In this manner, locations for source 32 and receivers 36 (i.e., source 32 and receiver 36 pairs) can be determined as being able to transmit diving waves 92 into a DOI of the subsurface 26. In some embodiments, step 90 may additionally include a comparison of an attribute of the diving waves 92 (e.g., the strength of the diving waves 92, the amount of diving waves 92, the location of the diving waves 92 in the DOI of the subsurface 26, etc.) passing through the DOI of the subsurface 26 against a threshold value so as to determine whether to include potential locations for source 32 and receivers 36 in the seismic survey design (i.e., to determine the acquisition geometry of the seismic survey design).

Figure 8:
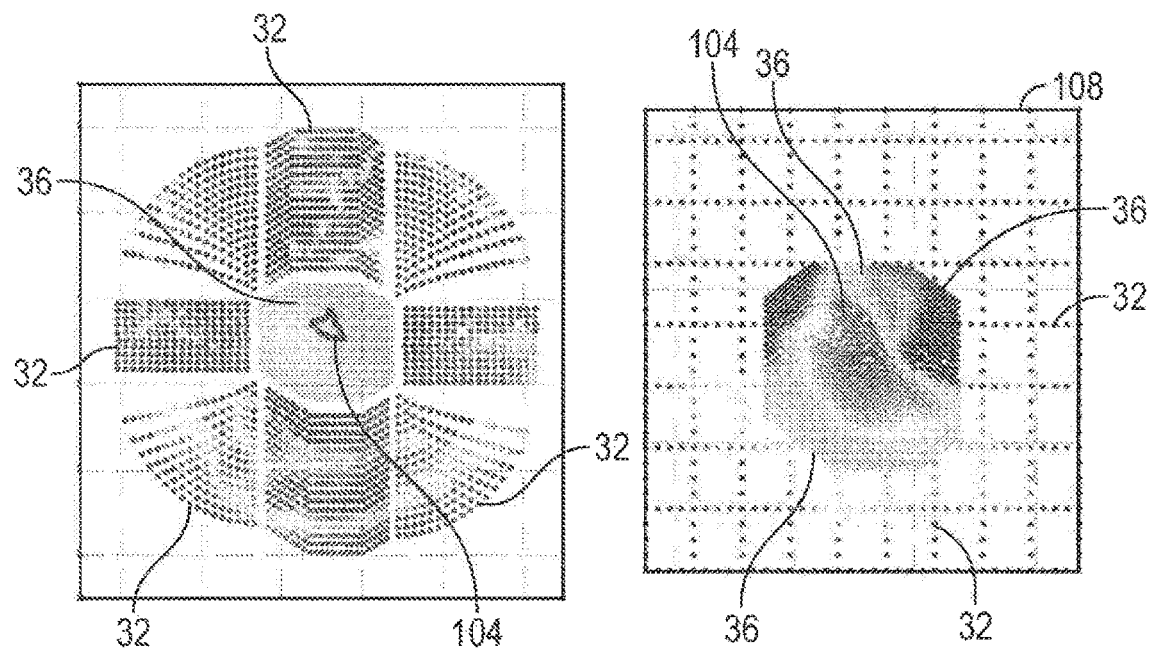
FIG. 8 illustrates source and receiver contribution maps generated from the processing sequence of FIG. 5, in accordance with embodiments presented herein.

In some embodiments, one or more maps of seismic acquisition geometry of the survey design may be generated as an output to be used in determining the final acquisition geometry of a survey design. FIG. 8 illustrates a map 106 (e.g., a map of seismic acquisition geometry) illustrating an example of the source 32 and receiver 36 locations. FIG. 8 also illustrates indications (e.g., represented as shades or other indications of intensity plots of the sources 32, which are indicative of the extracted seismic amplitudes of step 88 of process 78) of the pairs of sources 32 and receivers 36 that transmit diving waves 92 into a DOI of the subsurface 26 (i.e., region 104). FIG. 8 additionally illustrates a map 108 illustrating a corresponding version of map 106, which may be used in conjunction with or in place of map 108 in determining the final acquisition geometry of the survey design, Additionally or alternatively, result(s) (as data or another indication) indicative of the extracted seismic amplitudes of step 88 of process 78 of the locations for sources 32 and receivers 36 may be generated and/or output to be utilized in determining the final acquisition geometry of the survey design.

Technical effects of this disclosure include systems and methods for determining acquisition geometry of a survey design. More particularly, the acquisition geometry may be focused on a particular region of interest and the acquisition geometry may be particularly selected to transmit diving waves 92 into that region of interest. The acquisition geometry may also be selected to improve a velocity model that is subsequently generated, since generation of an updated velocity model is related to (i.e., can be generated based upon) source 32 and receiver 36 location, and the location of a DOI of a subsurface region 26. Thus, the systems and techniques described herein utilize (via process 78) a relationship between a velocity model (e.g., a known value, such as an initial velocity model), a DOI of a subsurface region 26 (e.g., a known value), and source 32 and receiver 36 locations (e.g., unknown values) to test locations for sources 32 and receivers 36 (i.e., source 32 and receiver 36 pairs) as being able to transmit diving waves 92 into the DOI of the subsurface 26. These locations for sources 32 and receivers 36 may then be used for a particular acquisition geometry of a survey design used to, for example, solve for a velocity model (e.g., an unknown value) using the acquisition geometry of the survey design (e.g., known values for the locations of the source 32 receiver 36 pairs) and the DOI of the subsurface region 26 (e.g., a known value). This allows for generation of an updated velocity model when the initial velocity model, for example, is a limitation on the quality of a seismic image (i.e., if a target region [DOI] is adequately illuminated, a generated image can be poor if the velocity model above it is not accurate). Thus, the systems and techniques described herein perform acquisition modeling to design seismic surveys optimized for velocity model building, so as to determine where to put the receivers and sources to achieve the objective of building an improved velocity model. This may lead to improvements in the seismic images generated, causing an improvement of a representation of hydrocarbons in a subsurface region of Earth or of subsurface drilling hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computer-implemented method, comprising:
  selecting a plurality of sets of source and receiver locations of a plurality of source and receiver pairs positioned over a survey area to improve a velocity model of a region of interest, wherein the region of interest corresponds to a problematic region in which use of the velocity model results in poor image quality;
  performing forward modeling on the velocity model based on each of the plurality of sets of source and receiver locations of the plurality of source and receiver pairs to generate low frequency seismic data;
  performing a reverse time migration on the low frequency seismic data to reposition a refraction wave energy and a diving wave energy of each of the plurality of source and receiver pairs and generate a diving wave illumination image;
  for each of the plurality of source and receiver pairs at the plurality of sets of source and receiver locations:
    extracting a seismic amplitude from the diving wave illumination image for a first source and receiver pair at a first source and receiver location;
    determining whether a diving wave between the first source and receiver pair at the first source and receiver location is transmitted into the region of interest corresponding to the problematic region based on the seismic amplitude extracted for the first source and receiver pair; and when the diving wave between the first source and receiver pair is transmitted into the region of interest corresponding to the problematic region:
  determining an attribute of the diving wave between the first source and receiver pair based on the seismic amplitude, wherein the attribute of the diving wave comprises at least one of a strength of the diving wave, an amount of waves included in the diving wave, or a location of the diving wave in a depth of investigation of the region of interest corresponding to the problematic region; and
  comparing the attribute of the diving wave between the first source and receiver pair to a threshold value to determine whether to include the first source and receiver location in a survey design; and
designing an acquisition geometry of the survey design based on the comparison of the attribute of the diving wave between the first source and receiver pair to a threshold value for each of the plurality of source and receiver pairs, indicating the contribution of the respective diving wave from each of the plurality of sets of source and receiver locations of each of the plurality of source and receiver pairs to the diving waves passing through the region of interest.

2. The computer-implemented method of claim 1, comprising generating an updated velocity model utilizing the acquisition geometry of the survey design and a location of the region of interest.

3. The computer-implemented method of claim 1, comprising generating a map of seismic acquisition geometry of a survey design indicative of the contribution of the respective diving wave from each of the plurality of source and receiver pairs to the diving waves passing through the region of interest.

4. The computer-implemented method of claim 3, comprising generating a final acquisition geometry of the survey design based upon the map of seismic acquisition geometry of a survey design.

5. The computer-implemented method of claim 1, comprising generating results indicative of the contribution of the respective diving wave from each of the plurality of source and receiver pairs to the diving waves passing through the region of interest.

6. The computer-implemented method of claim 5, comprising generating a final acquisition geometry of a survey design based upon the results.

7. The computer-implemented method of claim 1, wherein the low frequency seismic data comprise frequencies of between approximately 1.0 Hz-10.0 Hz.

8. A tangible, non-transitory, machine-readable media, comprising instructions configured to cause a processor to:
  select a plurality of sets of source and receiver locations of a plurality of source and receiver pairs positioned over a survey area to improve a velocity model of a region of interest, wherein the region of interest corresponds to a problematic region in which use of the velocity model results in poor image quality;
  perform forwarding modeling on the velocity model based on each of the plurality of sets of source and receiver locations of the plurality of source and receiver pairs to generate low frequency seismic data;
  perform a reverse time migration on the low frequency seismic data to reposition a refraction wave energy and a diving wave energy of the plurality of source and receiver pairs and generate a diving wave illumination image;
  for each of the plurality of source and receiver pairs at the plurality of sets of source and receiver locations:
    extract a seismic amplitude from the diving wave illumination image or a first source and receiver pair at a first source and receiver location;
    determine whether a diving wave between the first source and receiver pair at the first source and receiver location is transmitted into the region of interest corresponding to the problematic region based on the seismic amplitude extracted for the first source and receiver pair; and
    when the diving wave between the first source and receiver pair is transmitted into the region of interest corresponding to the problematic region:
      determine an attribute of the diving wave between the first source and receiver pair based on the seismic amplitude, wherein the attribute of the diving wave comprises at least one of a strength of the diving wave, an amount of waves included in the diving wave, or a location of the diving wave in a depth of investigation of the region of interest corresponding to the problematic region; and
      the attribute of the diving wave between the first source and receiver pair to a threshold value to determine whether to include the first source and receiver location in a survey designc; and
  design an acquisition geometry of the survey design based on the comparison of the attribute of the diving wave between the first source and receiver pair to a threshold value for each of the plurality of source and receiver pairs, indicating the contribution of the respective diving wave from each of the plurality of sets of source and receiver locations of each of the plurality of source and receiver pairs to the diving waves passing through the region of interest.

9. The tangible, non-transitory, machine-readable media of claim 8, comprising instructions configured to cause the processor to generate an updated velocity model utilizing the acquisition geometry of the survey design and a location of the region of interest.

10. A device comprising:
  a processor configured to:
    select a plurality of sets of source and receiver locations of a plurality of source and receiver pairs positioned over a survey area to improve a velocity model of a region of interest, wherein the region of interest corresponds to a problematic region in which use of the velocity model results in poor image quality;
    perform forwarding modeling on the velocity model based on each of the plurality of sets of source and receiver locations of the plurality of source and receiver pairs to generate low frequency seismic data;
    perform a reverse time migration on the low frequency seismic data to reposition a refraction wave energy and a diving wave energy of each of the plurality of source and receiver pairs to generate a diving wave illumination image;
    for each of the plurality of source and receiver pairs at the plurality of sets of source and receiver locations:
      extract a seismic amplitude from the diving wave illumination image for a first source and receiver pair at a first source and receiver locationat the region of interest corresponding to the problematic region when the seismic amplitude corresponds to a respective diving wave that is transmitted between a source and receiver pair of the plurality of source and receiver pairs and through the region of interest corresponding to the problematic region;

determine whether a diving wave between the first source and receiver pair at the first source and receiver location is transmitted into the region of interest corresponding to the problematic region based on the seismic amplitude extracted for the first source and receiver pair; and when the diving wave between the first source and receiver pair is transmitted into the region of interest corresponding to the problematic region:

determine an attribute of the diving wave between the first source and receiver pair based on the seismic amplitude, wherein the attribute of the diving wave comprises at least one of a strength of the diving wave, an amount of waves included in the diving wave, or a location of the diving wave in a depth of investigation of the region of interest corresponding to the problematic region; and compare the attribute of the diving wave between the first source and receiver pair to a threshold value to determine whether to include the first source and receiver location in a survey designcompute a contribution of the respective diving wave from the source and receiver pair to diving waves passing through the region of interest corresponding to the problematic region-based-on-a comparison of the seismic amplitude to a threshold value; and design an acquisition geometry of the survey design based upon the comparison of the attribute of the diving wave between the first source and receiver pair to a threshold value for each of the plurality of source and receiver pairs, indicating the contribution of the respective diving wave from each of the plurality of sets of source and receiver locations of each of the plurality of source and receiver pairs to the diving waves passing through the region of interest.

11. The device of claim 10, wherein the processor is configured to generate an updated velocity model utilizing the acquisition geometry of the survey design and a location of the region of interest.

12. The device of claim 10, wherein the processor is configured generate a map of seismic acquisition geometry of a survey design indicative of the contribution of the respective diving wave from each of the plurality of source and receiver pairs to the diving waves passing through the region of interest.

13. The device of claim 12, comprising an output configured to transmit the map of seismic acquisition geometry of a survey design to be used in generating a final acquisition geometry of the survey design.

14. The device of claim 10, wherein the processor is configured to generate results indicative of the contribution of the respective diving wave from each of the plurality of source and receiver pairs to the diving waves passing through the region of interest.

15. The device of claim 14, comprising an output configured to transmit the results to be used in generating a final acquisition geometry of a survey design.

* * * * *